Jan. 10, 1961
A. S. McKAY ET AL
2,967,938
THICKNESS MEASUREMENT
Filed Feb. 9, 1956
2 Sheets-Sheet 1
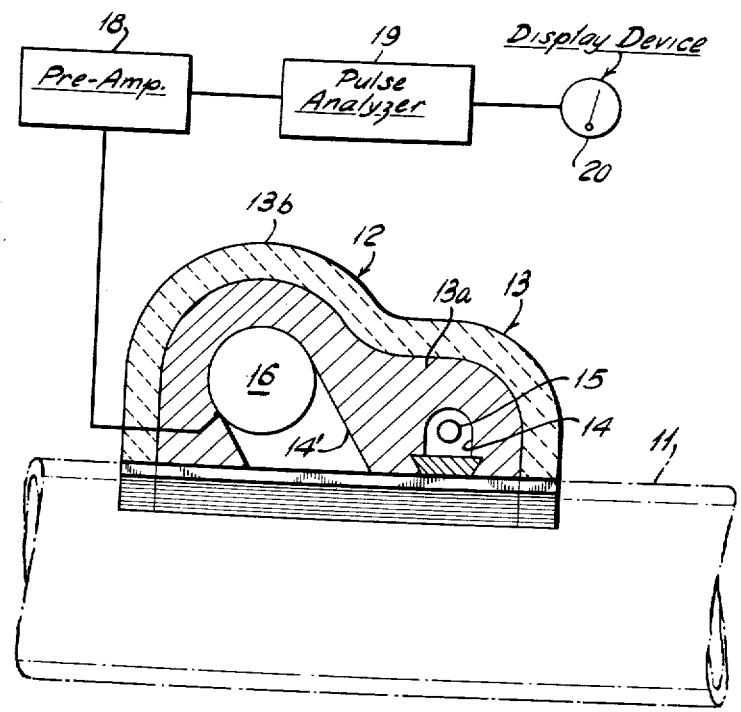
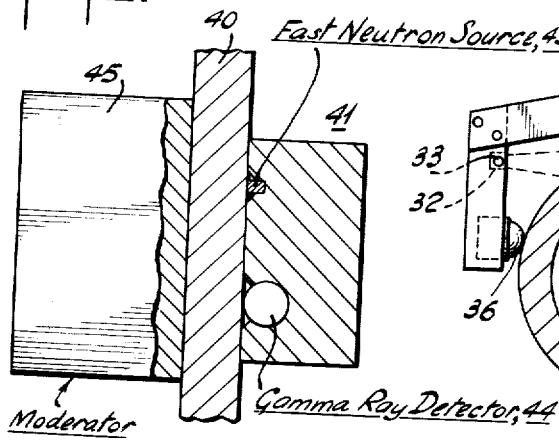
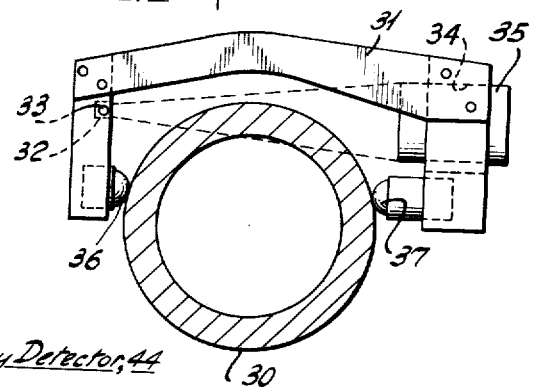

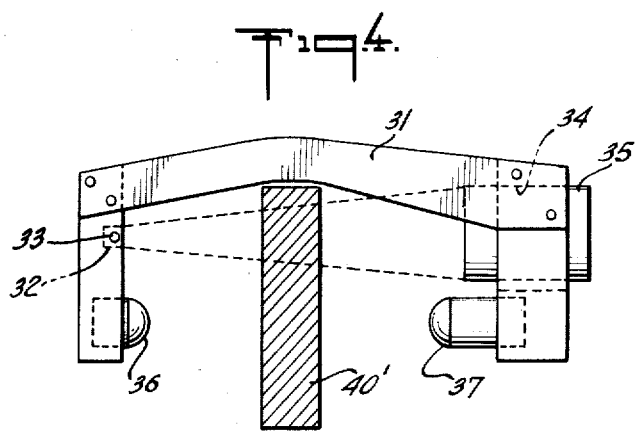

United States Patent Office 2,967,938
Patented Jan. 10, 1961

2,967,938

THICKNESS MEASUREMENT

Alexander Scott McKay, Bellaire, and Arthur Herbert Lord, Jr., Houston, Tex., and Rowland W. Johnston, Jr., Sacramento, Calif., assignors to Texaco Inc., a corporation of Delaware Filed Feb. 9, 1956, Ser. No. 564,409

18 Claims. (Cl. 250—83.3)

The present invention relates generally to thickness measurements and, more particularly, to determination of the thickness of various media by means of improvements in radioactivity techniques.

It is a general object of the present invention to provide improvements in determining the thickness of a substance by radioactivity techniques.

It is well known that the thickness of various materials, including metal plates and pipe walls and the like, can be determined as a function of the scattering and transmission of penetrative radiation, particularly gamma-rays and the like. Methods and apparatus for such measurement are set forth, for example, in U.S. Patent 2,277,756, issued March 31, 1942 to D. G. C. Hare and re-issued on August 22, 1952 as Re. 22,531. The prior art thickness determination techniques, such as those disclosed in the Hare patent, involve the utilization of a gamma-ray source and detector for determining the transmission or scattering characteristics of the material whose thickness is to be determined. Work has also been done involving the substitution of a neutron source and neutron detector for the gamma-ray source and detector, as shown for example in U.S. Patent No. 2,549,176, issued April 17, 1951 to K. C. Crumrine.

In general, radioactivity types of thickness measurements afford the advantage of providing means for measuring the thickness of a wall or pipe under circumstances wherein access may be had to only one side of the wall or pipe. Various techniques may be employed to make such measurements. For example, a scattering technique may be employed wherein the source and detector are located on the same side of the wall whose thickness is to be measured and wherein the amount of radiation scattered back by the wall is proportional to the amount of material causing the scattering and, thus, is proportional to the thickness of the wall. In those cases where access may be had to both sides of the wall to be measured a transmission technique may be employed wherein the source and the detector may be placed on opposite sides of the wall and the amount of radiation transmitted through the wall is measured as an indication of the thickness of the wall. In the case of measurement of the thickness of a pipe or tubing, a modified transmission type technique may be employed, even in the case where access may be had to only the outside surface of the pipe. This technique is generally referred to as the tangential method and involves directing radiation, such as gamma-rays, through a portion of the pipe wall to be measured on a line generally tangent to the circumference of the pipe, i.e., along a chord of the pipe. The tangential technique and apparatus for practicing same are set forth, for example, in U.S. Patent 2,486,902, issued November 1, 1949 to A. Wolf.

Although the aforementioned prior art radioactivity techniques for the measurement of thickness are quite useful, they are not without certain difficulties. For example, the gamma-ray techniques are hampered by the fact that the gamma-rays are readily absorbed by the material measured so as seriously to limit the thickness of the material which may be accurately measured. This is particularly true in the case of the relatively weak back-scattered gamma-rays of the scattering methods. Iron, for example, has a comparatively high absorption co-efficient for gamma-rays.

Although the use of a neutron source and neutron detector extends the effective range of measurement attainable, their use interposes additional difficulties of detection. For the most part, gamma-rays may be more readily detected than neutrons under these circumstances.

Accordingly, it is an object of the present invention to provide improvements in radioactivity thickness measurements wherein the range of measurement is increased beyond that of conventional gamma-ray type thickness measurements.

It is another object of the invention to provide improvements in radioactivity thickness measurement techniques wherein the radiation to be measured is of a type which may be readily detected.

Briefly stated, in accordance with a general aspect thereof, the invention may be carried out with a source of neutrons and a detector of gamma-rays. The invention may be carried out by irradiating a substance whose thickness is to be determined with neutrons in such manner as to cause the neutrons to induce gamma-rays in the substance. The neutron-induced gamma-rays are then emitted from the substance and detected as an indication of the thickness of the substance.

In accordance with a preferred embodiment of the invention, the source and the detector are positioned on the same general side of an object so as to provide a scattered-type of measurement wherein the neutron source is caused to produce gamma-rays in the object whose thickness is to be determined.

In accordance with another embodiment, the source and detector may be placed on generally opposite sides of the substance to be measured. In the case of a pipe measurement, this embodiment may be carried out by means of a tangential-type measurement.

One aspect of the invention is concerned with irradiating a substance whose thickness is to be determined with fast-neutrons in such manner as to produce gamma-rays in the substance through inelastic scattering. The gamma-rays thus produced are then detected as an indication of the thickness of the substance.

Another aspect of the invention is concerned with irradiating a substance whose thickness is to be measured with thermal-neutrons in order to induce gamma-rays therein by a neutron capture effect. The gamma-rays thus produced are then detected as an indication of the thickness of the substance.

In accordance with still another aspect of the invention, a source of fast-neutrons and a moderator are positioned on opposite sides of a substance to be measured in such manner that fast-neutrons produced by the source are transmitted through the substance to the moderator wherein they produce thermal-neutrons, some of which, in turn, irradiate the substance wherein they induce gamma-rays. The thermal-neutron gamma-rays thus induced are detected on the same general side of the substance as the fast-neutron source as an indication of the thickness of the substance.

For additional objects and advantages, and for a better understanding of the invention, attention is now directed to the following description and accompanying drawing. The features of the invention which are believed to be novel are particularly pointed out in the appended claims.

Referring to the drawings:

Figure 1 is a side elevational view, partly in cross-section and partly in block-form, illustrating apparatus for measuring the thickness of an object, in this case the wall of a pipe, in accordance with invention;

Figure 2 is a side view, partly in cross-section, of apparatus for measuring the thickness of wall in accordance with another aspect of the invention;

Figure 3 is a side view, partly in cross-section, illustrating apparatus for carrying out still another aspect of the invention; and Figure 4 is a side view, partly in cross-section, illustrating apparatus like that shown in Figure 3 as used for measuring the thickness of a wall as shown in Figure 2.

Referring now to Figure 1, there is shown a wall 11, which may be a pipe wall, as shown, and which may be formed of iron or the like, whose thickness is to be determined. Adjacent the wall 11 there is positioned a thickness measurement apparatus 12 comprising a housing 13 having a first recessed portion 14 containing a source of neutrons 15 and a second recessed portion 14′ containing a gamma-ray detector 16. In accordance with one aspect, the source of neutrons 15 may comprise a fast-neutron source, for example, radium-beryllium or polonium-beryllium.

Further in accordance with the invention, the fast-neutron source may comprise electrical apparatus such as a linear-accelerator provided with a suitable target capable of producing fast-neutrons. In accordance with another aspect, the source of neutrons 15 may comprise a slow-neutron source which, for example, may be constituted of a fast-neutron source, as described above, together with a suitable moderator, e.g., paraffin, in order to convert the fast-neutrons to slow-neutrons. The detector 16 may comprise a scintillation-type detector sensitive to the gamma-rays induced by the neutron source employed and preferably insensitive to the neutrons emitted by the source. Alternatively, an appropriate Geiger-Mueller detector may be employed, especially one of the multiple-cathode type. Preferably, the detector 16 should be operated proportionally in order to favor the detection of the desired gamma-rays induced in the wall, to the exclusion of undesired background radiation. The housing 13 may function as a support for the source 15 and the detector 16 and also preferably serves as a radiation shield to protect the operator from both the neutron and gamma-radiations. In order to afford adequate shielding, therefore, the housing 13 should preferably comprise both neutron and gamma-ray absorbers, such as boron and lead, respectively, and should be of adequate thickness to afford sufficient shielding in accordance with well-known principles of radiation safety.

The desired shielding may be achieved by forming the housing 13 of an inner portion 13a comprised of lead and an outer or casing portion 13b comprised of boron and paraffin in order to provide the desired gamma-ray and neutron shielding, respectively. A cover portion 17 is provided for enclosing the first recess portion 14 and may be likewise formed of lead in order to provide a neutron permeable enclosure for the source which, nevertheless, affords adequate gamma-ray shielding. It will be appreciated by those skilled in the art that such a neutron permeable gamma-ray shield is of particular utility in the case where a neutron source is employed such as radium beryllium, or the like, wherein gamma rays may also be emitted along with the desired neutrons.

In accordance with another embodiment of the invention, it is contemplated to enclose the source 15 permanently within the housing 13, as by casting the source 15 in the lead forming the housing rather than using a cover portion 17, as shown.

As will be readily appreciated by those skilled in the art, when heavy materials such as lead are employed to shield against gamma-rays the interest of portability dictates that a minimum quantity of such material be employed, consistent with the desired degree of shielding.

The output of the detector unit 16 is shown coupled through an appropriate conductor to a pre-amplifier 18 for enhancing the output-signal of the detector unit 16. The output of the pre-amplifier 18 is coupled to a pulse-amplitude analyzer 19 whose output, in turn, is coupled to an appropriate display device, such as the meter 20 or an oscilloscope (not shown). A recorder (not shown) may also be employed to record the output of the detector 16 in known-manner.

Briefly considering the operation of the present invention in general, neutrons traveling from the source 15 enter the wall 11 wherein they undergo interactions with the material of the wall whereby they induce gamma-rays, which are then propagated in random direction, some of which reach the detector 16 where they are detected and converted into electric impulses that, in turn, produce a sensible display on the meter 20 or similar apparatus. Despite the fact that many of the gamma-rays may fail to reach the detector; nevertheless, the number of those that do is proportional to the amount of material with which the neutrons from the source interact. Thus, up to a saturation point, as determined by each substance, the intensity of the detected gamma-rays is a direct function of the thickness of the wall at the place of measurement.

As will be appreciated by those skilled in the art, the definition of the thickness measurements, i.e., the ability of the apparatus to measure accurately comparatively small areas depends upon the cross-sectional area of the neutron beam employed to irradiate the wall and the cross-sectional area of the gamma-ray beam detected. Accordingly, the side of the source 15 facing the wall 11 may be confined to a comparatively thin cross-sectional area, consistent with its intensity. In view of the extreme difficulty in collimating a neutron beam from such a source with shielding material, collimation should be achieved by limiting the effective area of the gamma-ray detector 16, since the gamma-rays perceived by the detector may be effectively collimated by means of a lead shield, or the like. Thus, collimation of the detector, whereby it is effectively limited to a narrow portion of the gamma-ray pattern produced in the wall by the neutron source 14, enables a skilled operator employing this apparatus to detect variations in a comparatively small portion of a larger area, as contrasted with a detector that is sensitive to a comparatively large area inasmuch as integration tends to mask slight variations within the overall area subjected to the neutron beam.

When a neutron source such as radium-beryllium source which may also produce gamma-rays is employed, collimation of the source affords the further advantage of reducing the extent of the gamma-rays emitted by the source.

In accordance with the aspect of the invention wherein a fast-neutron source is employed to irradiate a substance to be measured, gamma-rays are induced in the substance due to inelastic scattering of the fast neutrons. The fast-neutron gamma-rays thus induced have a characteristic energy range as determined by the substance responsible for the scattering effect and the fast-neutrons of the source must be of higher energy level than the induced gamma-rays. In the case of measurement of a wall, or the like, comprised of iron the fast-neutron source induces gamma-rays having an average energy of approximately 0.8 million electron volts. In this case, it is necessary that the fast neutrons have an energy in excess thereof. The detector is preferably attuned as nearly as possible to the characteristic energy level (0.8 mev. for iron) in order to be insensitive to interferences from background radiation of different energy levels.

In accordance with the aspect of the invention wherein a thermal-neutron source is employed to irradiate a material under measurement, gamma-rays are induced in the material as a result of a thermal-neutron capture effect. The gamma-rays thus induced ordinarily have a characteristic energy level as determined by the substance under measurement. In the case where the material under analysis comprises iron, gamma-rays having an average energy level of approximately 7.1 million electron volts are induced in response to the thermal-neutrons. The comparatively high energy of the thermal-neutron induced gamma-rays, especially in the case of iron, or the like, makes the thermal-neutron gamma type measurement a particularly desirable one, inasmuch as the high-energy gamma-rays may be readily detected by means of a proportional type counter in such manner that lower energy background radiation may be effectively excluded from the desired measured signals, thus reducing the actual number of gamma-ray interactions necessary for accurate thickness measurement.

In the case wherein a thermal-neutron source is employed which comprises a fast-neutron source together with an appropriate moderator, e.g., paraffin or water, some of the fast neutrons slowed to the thermal range may also be captured by the moderator with the resultant production of neutron-capture gamma-rays, which in the case of paraffin or water, have an average energy range of 2.2 mev. The gamma-rays thus produced in the moderator may provide a source of interference with the desired signal, unless appropriate means are taken to render the detector insensitive to them. In the case of a proportional counter, however, either of the Geiger-Mueller or scintillation type, these relatively low-energy gamma-rays may be effectively discriminated against by establishing the detector bias at an appropriate level to reject these low-energy gamma-rays while detecting the desired high-energy gamma-rays induced in the material under measurement.

In accordance with another aspect of the invention, a substance whose thickness is to be determined is irradiated with fast-neutrons that originate at a location on one side of the substance, whereby some of the fast-neutrons are caused to penetrate the substance, and a hydrogenous material is located on the opposite side of the substance in order to intercept fast-neutrons passing through the substance and convert them into thermal-neutrons. Thermal-neutrons thus produced in the hydrogenous moderator are then caused to irradiate the substance from said other side, whereby they induce gamma-rays in the substance, some of which are transmitted through the remainder of the substance to a gamma-ray detector positioned in the vicinity of the fast-neutron source. Apparatus in accordance with this aspect of the invention, is shown in Figure 2.

Referring now to Figure 2, there is shown a wall 40 which may be formed of iron, or the like, whose thickness is to be determined. On one side of the wall there is positioned a thickness measurement apparatus 41 comprising a housing 42 containing a source of fast-neutrons 43 and a gamma-ray detector 44. The source 43 may be of the type discussed above in regard to Figure 1. The detector 44 may, likewise, comprise a gamma-ray detector of the type discussed above. As in the case of the apparatus of Figure 1, the housing may function as a support for the source and detector and may also serve as a shield to protect the operator from the neutron and the gamma radiations. A moderator 45, which may be formed of paraffin or other hydrogenous material, is positioned opposite the instrument 41 adjacent the side of the wall opposite the source and detector. The moderator may comprise a liquid such as water within a pipe whose wall-thickness is to be measured. Where access may be had to one side of a wall only, due to the presence of water on the inaccessible side, as is the case of a floating ship whose hull-thickness is to be measured, the moderator may comprise the water in contact with the inaccessible side of the wall. In any event, the moderator should be of sufficient thickness to produce an adequate supply of thermal-neutrons in response to fast-neutrons impinging thereupon from the source. Preferably the thickness of the moderator should be at least that of approximately 6 inches of water or its equivalent in hydrogen content.

In order to facilitate shielding, particularly when the apparatus is in operation, it is contemplated to recess the source in a suitable slot in the housing. An appropriate cover shield (not shown) may be provided for shielding the source within the instrument when not in operation.

In the operation of the apparatus of Figure 2, fast-neutrons traveling from the source 43 through the wall 40 to the moderator 45 are effected very little by the presence of the metal wall 40. Although some of the fast-neutrons may be slowed down and eventually captured in the moderator, many of the fast-neutrons produce thermal-neutrons and some of the latter irradiate the wall wherein they undergo capture by the material of the wall whereby gamma-rays are emitted. Although the gamma-rays thus induced are ordinarily dispersed in random directions, sufficient numbers of them travel in the direction of the detector to provide an effective indication of the thickness of the wall 40 in accordance with the invention. Inasmuch as thermal-neutrons have a much higher capture cross-section in the wall than the fast-neutrons, the number of gamma-rays that reach the detector as a result of thermal-neutron capture effects provides an effective means for determining the thickness of the wall. In this instance, the counting rate of the detector increases as the wall thickness increases.

This aspect of the invention is of particular utility in the measurement of material such as iron or steel, or the like, wherein the thermal neutron capture effect produces comparatively high energy gamma-rays which may be effectively detected to the exclusion of high energy background radiation. As discussed above, the capture of thermal-neutrons by iron induces gamma-rays having an average energy of approximately 7.1 million electron volts.

In accordance with a preferred embodiment, a scintillation-type detector is employed. In those cases wherein a scintillation detector is employed having a neutron-sensitive luminophor, e.g., sodium iodide, a further aspect of the invention is concerned with shielding the detector with an element having a comparatively high neutron capture cross-section, for example boron, in order to reduce the flow of thermal neutrons which may interfere with the desired gamma-ray detection. In the case of a Geiger-Mueller type detector, it is not normally necessary to provide such shielding, inasmuch as such detectors do not normally have an appreciable sensitivity for thermal-neutrons.

It is noted that the conventional gamma-ray type thickness measuring apparatus, which detects scattered gamma-radiation produced by a gamma-ray source, is normally limited to a maximum effective range of approximately ¾ to 1 inch of iron. Measurements in accordance with the present invention, on the other hand, have been found to provide effective measurements at more than twice this range.

Referring now to Figure 3, there is shown another embodiment of apparatus for measuring the thickness of a pipe wall in accordance with the invention. A pipe 30, which may be formed of iron or steel, or the like, is shown having mounted thereon a tangential type measurement apparatus comprising a housing 31 formed of appropriate shielding material. In accordance with one embodiment, the housing 31 may be appropriately formed so as to position the source and detector at opposite ends of a chord of a pipe whose wall is to be measured. Apparatus similar to that shown in Figure 3 of the aforementioned patent of A. Wolf may be employed, provided of course, that an appropriate neutron source and gamma-ray detector is employed, rather than the source-detector combination of Wolf. Different aspects of the embodiment of Figure 3 are concerned with the use of a fast or slow neutron source together with an appropriate gamma-ray detector, as in the case of the apparatus shown in Figure 1. In accordance with another embodiment (not shown) of the tangential type apparatus, an arcuate recess portion may be provided so that the housing 31 will conform to the surface of a pipe to be measured. In accordance with the illustrated embodiment, the housing 31 is provided with a first recess portion 32 aligned generally tangent to the wall of the pipe 30 and containing a source of fast neutrons 33, such as discussed above with regard to Figure 1. A second recess portion 34 is provided opposite the first recess 32. A detector of gamma-rays 35 is provided in the second recess. The output of the detector 35 may be coupled to appropriate signal translation and display apparatus such as that shown in Figure 1, coupled to the output of the detector 16. First and second bearing means 36, 37 may be employed to support the housing 31 in the proper position on the pipe 30.

In the operation of the apparatus of Figure 3, the fast-neutrons produced by the source 33 are caused to intercept the wall of the pipe 30 along a generally tangential path. Many of the neutrons which intercept the pipe 30 interact with the material thereof and induce gamma-rays therein. The gamma-rays thus induced emanate in various random directions from the place of production. Some of these gamma-rays continue along the generally tangential path of the neutrons that induce them and enter the recess 34 wherein they are detected by the detector 35 and measured by means of appropriate display apparatus, as in the case of the apparatus of Figure 1.

Referring now to Figure 4, there is shown apparatus identical with that shown in Figure 3, and bearing identical reference numerals, mounted across a wall 40' which may be generally like the wall 40 shown in Figure 2. Figure 4 thus illustrates the invention as it involves the source and detector on opposite sides of the wall 40'.

Although Figure 4 illustrates the source and detector on opposite sides of a wall accessible from both sides and which might be measured by other means such as a mechanical caliper device suitable for spanning the wall, it is noted that the present invention is of particular utility in cases where a mechanical device cannot span the wall. In such cases, the source and detector are separately mounted so that they may be positioned on opposite sides of the wall without limitation of the housing member 31 connecting the source and detector as shown in the embodiment of Figure 4. Accordingly, it is understood that the source and detector need not be joined as specifically shown in Figure 4.

In practice, the apparatus may be calibrated for a given material, such as iron, by examination of a sample of known, graduated thickness.

While certain specific embodiments have been shown and described, it will be understood that various modifications may be made without departing from the principles of the invention. The appended claims are, therefore, intended to cover any such modifications within the true spirit and scope of the invention.

We claim:

1. The method of determining the thickness of a substance which comprises directing a source of neutrons toward the substance whose thickness is to be determined in such manner as to cause prompt gamma-rays to be induced in the substance, which gamma-rays are emitted therefrom, concurrently detecting said emitted gamma-rays, providing a signal that is proportional to the detected gamma ray flux and correlating said signal with reference data obtained by examination of a sample of similar substance of predetermined thickness as an indication of the thickness of the substance at the place of measurement.

2. The method of measuring the thickness of a wall from one side thereof which comprises directing a source of neutrons into said wall from one side thereof in such manner as to cause said neutrons to interact with material of said wall to induce prompt gamma-rays therein and concurrently detecting from the same side of said wall gamma-rays emanating from said wall in response to said neutrons, providing a signal display proportional to the intensity of the detected gamma rays and correlating said signal display with calibration data obtained by performing the above recited steps with respect to a calibration standard as an indication of the thickness of said wall at the place of measurement.

3. The method of measuring the thickness of a wall from one side thereof which comprises positioning a source of neutrons near the surface of said wall so that neutrons produced by said source enter said wall wherein prompt gamma rays are induced with some of the gamma-rays returning outwardly of said wall, concurrently positioning a gamma-ray detector in the vicinity of said source on the same side of said wall, and concurrently detecting the amount of said gamma-rays returning from said wall by means of said gamma-ray detector, providing a signal display proportional to the intensity of the detected gamma-rays and correlating said signal display with calibration data obtained by performing the above recited steps with respect to a calibration standard as an indication of the thickness of said wall.

4. The method of measuring the thickness of a wall which comprises directing a source of neutrons into said wall from one side thereof in such manner as to cause said neutrons to interact with the material of said wall to induce prompt gamma-rays therein and concurrently detecting from the opposite side of said wall gamma-rays emanating therefrom in response to said neutrons, providing a signal display proportional to the intensity of the detected gamma rays and correlating said signal display with calibration data obtained by performing the above recited steps with respect to a calibration standard as an indication of the thickness of said wall at the place of measurement.

5. The method of measuring the thickness of the wall of a curved object such as a pipe or the like which comprises directing a source of fast neutrons tangentially through a section of the wall in such manner as to cause said fast neutrons to interact with material of said wall to induce prompt gamma rays therein and concurrently detecting gamma-rays emanating from said wall at a location near the outer surface of the wall tangentially opposite said source, providing a signal display proportional to the intensity of the detected gamma rays and correlating said signal display with calibration data obtained by performing the above recited steps with respect to a calibration standard as an indication of the thickness of said wall.

6. A device for determining the thickness of a substance comprising a housing member adapted and arranged to be placed adjacent the substance, a source of neutron radiation disposed within said member, said member being provided with a neutron permeable aperture for directing a beam of said radiation from said source into said wall for inducing gamma-radiation therein, means including a gamma-ray detector for concurrently intercepting the gamma-radiation produced in said wall in response to said neutrons and means associated with said detector means for indicating the amount of gamma-radiation intercepted by the detector.

7. A device for determining the thickness of a wall from one side thereof comprising a housing member adapted and arranged to be placed on one side of said wall, a source of neutron radiation disposed within said member, said member being provided with a neutron permeable aperture for directing a beam of said radiation from said source into said wall for inducing gamma-ray radiation therein, means including a gamma-ray detector associated with said housing member for concurrently intercepting a portion of the gamma-radiation induced in said wall in response to said neutrons, and means associated with said detector for indicating the amount of gamma-radiation intercepted by the detector.

8. A device for measuring the thickness of a uniformly curved wall comprising a housing member, a source of neutrons mounted on said member, a detector of gamma-rays mounted on said members opposite said source, and means for positioning said member near one side of said wall with said source and said detector facing one another along an axis that is generally tangent to the curved wall so that neutrons emitted by said source will pass generally tangentially through a portion of said wall wherein they will induce gamma-rays which will pass through the remaining portion of said wall to the detector.

9. The method of claim 2 wherein the neutrons from the source are fast-neutrons.

10. The method of claim 2 wherein the neutrons from the source are slow-neutrons.

11. The method of claim 4 wherein the neutrons from the source are fast-neutrons.

12. The method of claim 4 wherein the neutrons from the source are slow-neutrons.

13. The method of determining the thickness of an object comprising the steps of producing fast-neutrons adjacent the object on one side thereof and transmitting said fast-neutrons through said object, intercepting and moderating said fast-neutrons on the opposite side of said object, thereby producing thermal-neutrons in response to said fast-neutrons, causing said thermal-neutrons to irradiate said object from said other side whereby gamma-rays are induced in said object some of which continue through said object to said one side, detecting gamma-rays on said one side, and providing a display that is proportional to the intensity of the detected gamma-rays for correlation with calibration data in order to determine the thickness of said object.

14. Apparatus for determining the thickness of a substance comprising a source of fast-neutrons, a detector of gamma-rays, a housing adapted and arranged to contain said source and said detector and adapted and arranged to be positioned on one side of a substance whose thickness is to be measured, a portable moderator comprising a predetermined quantity of an hydrogenous material adapted and arranged to be positioned on the opposite side of said substance, and indicating means associated with said detector for providing a signal display that is proportional to the counting rate of gamma rays impinging upon said detector.

15. The method of determining the thickness of an object which comprises directing a source of thermal-neutrons toward the object whose thickness is to be determined in such manner as to cause prompt gamma-rays having a characteristic energy range to be induced in the object, which gamma-rays are emitted therefrom, and concurrently selectively detecting emitted gamma-rays of said characteristic energy range to the exclusion of gamma-rays of appreciably lower energy as an indication of the thickness of the object at the place of measurement.

16. The method of claim 15 wherein the object comprises iron and wherein gamma-rays having an average energy value of approximately 7 million electron volts are detected to the substantial exclusion of gamma-rays of appreciably lower energy values.

17. The method of determining the thickness of an object comprising the steps of producing fast neutrons adjacent the object on one side thereof and transmitting said fast neutrons through said object, intercepting and moderating said fast neutrons on the opposite side of said object, thereby producing moderated neutrons in response to said fast neutrons, causing said moderated neutrons to irradiate said opposite side of the object whereby moderated neutrons are caused to penetrate said objects, detecting gamma radiation emitted from said object which is due to irradiation of the object by said moderated neutrons, providing a signal that is proportional to the detected radiation flux, and correlating said signal with reference data obtained by performing the above recited steps with respect to a calibration standard as an indication of the thickness of said object.

18. The method of measuring the thickness of a conduit surrounded by a substantial quantity of neutron moderating material of uniform hydrogenous content comprising the steps of passing an instrument through the conduit, which instrument contains a source of fast neutrons and a detector of moderated neutrons, transmitting fast neutrons from the source through the conduit into the hydrogenous moderator in order to produce moderated neutrons external to said conduit, whereby moderated neutrons irradiate the conduit, detecting gamma radiation emitted from said conduit as a result of the irradiation of the conduit by said moderated neutrons, providing a signal that is proportional to the detected radiation flux, and correlating said signal with reference data obtained by performing the above recited steps with respect to a calibration standard as an indication of the thickness of said conduit.

References Cited in the file of this patent

UNITED STATES PATENTS

| Re. 22,531 | Hare | Aug. 22, 1944 |
|---|---|---|
| 2,231,577 | Hare | Feb. 11, 1941 |
| 2,486,902 | Wolf | Nov. 1, 1949 |
| 2,509,344 | Herzog | May 30, 1950 |
| 2,515,535 | Thayer et al. | July 18, 1950 |
| 2,652,496 | Herzog et al. | Sept. 15, 1953 |
| 2,723,351 | Garrison et al. | Nov. 8, 1955 |
| 2,748,290 | Reichertz | May 29, 1956 |

OTHER REFERENCES

Development in Thickness Gauges and Allied Instruments, by Putman, paper submitted to Geneva Conference, August 1955, vol. 15, pp. 119-123; published by United Nations, New York, 1956; Peaceful Uses of Atomic Energy.

Korff: Electron and Nuclear Counters (1955), D. Van Nostrand Company, Inc.